United States Patent

Nagler

Patent Number: 5,350,250
Date of Patent: Sep. 27, 1994

[54] QUICK COUPLING OF A FRONT WORK ATTACHMENT ON EXCAVATORS

[76] Inventor: Jürgen Nagler, Kirchender Dorfweg 5, W-5804 Herdecke, Fed. Rep. of Germany

[21] Appl. No.: 49,964

[22] Filed: Apr. 20, 1993

[63] Continuation of Ser. No. 768,859, filed as PCT/EP91/000073, Jan. 17, 1991, published as WO91/11565, Aug. 8, 1991, abandoned.

[30] Foreign Application Priority Data

Jan. 24, 1990 [DE] Fed. Rep. of Germany ... 9000721[U]

[51] Int. Cl.$^5$ ............................................. E02F 9/00
[52] U.S. Cl. .................................. 403/316; 403/353; 414/723; 37/468
[58] Field of Search ............ 414/723; 37/118 R, 103, 37/468; 403/254, 316, 317, 353; 172/272, 275

[56] References Cited

U.S. PATENT DOCUMENTS

| | | | |
|---|---|---|---|
| 4,136,792 | 1/1979 | Wilson. | |
| 4,413,366 | 11/1983 | Whitehead | 403/254 X |
| 4,663,866 | 5/1987 | Karlsson et al. | 414/723 X |
| 4,871,292 | 10/1989 | Milanowski | 414/723 |
| 5,082,389 | 1/1992 | Balemi | 414/723 |

FOREIGN PATENT DOCUMENTS

| | | |
|---|---|---|
| 0143074 | 9/1984 | European Pat. Off. . |
| 0353454 | 2/1990 | European Pat. Off. . |
| 3018831 | 11/1980 | Fed. Rep. of Germany . |
| 2631052 | 5/1988 | France . |
| 1545861 | 5/1979 | United Kingdom . |
| 2172045 | 4/1986 | United Kingdom ........... 403/316 |

Primary Examiner—Donald W. Underwood
Attorney, Agent, or Firm—Anderson Kill Olick & Oshinsky

[57] ABSTRACT

A device for the quick coupling of a front work attachment on excavators, particularly for the quick coupling of excavator shovels, having two coupling plates (4, 4a, 20, 20a) at the free end (1) of the excavator boom (2) on the one hand and at the work equipment (3) on the other hand, provides a solution through which the consequences of appearances of wear at the locking elements in the coupling for receiving and changing a front work attachment for an excavator boom can be sharply reduced, wherein a quick coupling of the work equipment at the excavator boom is simultaneously ensured. This is achieved in that the locking element (18, 24) engages in at least one of the catch recesses (10, 25, 26) of the coupling plate (4a, 20a) in the coupling position.

3 Claims, 4 Drawing Sheets

QUICK COUPLING OF A FRONT WORK ATTACHMENT ON EXCAVATORS

This is a continuation of application Ser. No. 07/768,859, filed Sep. 23, 1991, now abandoned.

FIELD OF THE INVENTION

The invention is directed to a device for the quick coupling of a front work attachment on excavators.

BACKGROUND OF THE INVENTION

In presently utilized excavators, e.g. hydraulic excavators, the effort is made to provide the user with the greatest possible number of possibilities of use with work equipment, so that the booms of the excavators are designed in such a way that front work attachments can be exchanged at the boom. Thus, excavator shovels can be exchanged for two clam shell grabs, for hydraulic grabs, hydraulic hammers, vacuum lifters and the like, to list only a few possibilities.

A device for the coupling when receiving and changing a front work attachment is known, e.g. from WO 83/03629. In the latter, the connection of excavator booms and work equipment is effected by means of coupling plates which are arranged at the work equipment and excavator boom. The coupling plate arranged at the work equipment is provided with various catch recesses constructed as projections; catch elements of various shapes, which are connected with the coupling plate of the excavator boom, engage in the catch recesses in order to receive the work equipment. At least a portion of these catch elements is constructed so as to be movable around an axis and can be positioned by the driver from the driver's seat in order to be inserted into the corresponding catch projections which are provided with corresponding bore holes for the positive-locking engagement of the catch elements.

The coupling process is further reinforced in that as soon as an opening, which is provided at the coupling plate of the excavator boom, engages around a locking bar projection, which is arranged at the coupling plate of the work equipment, a movable locking bar, which is arranged at the coupling plate of the excavator boom, is pressed into the locking bar projection via a hydraulic or mechanical device until all catch elements are securely locked into the corresponding catch projections. The excavator boom and the work equipment are now securely connected with one another.

Such a coupling device has several grave disadvantages. On the one hand, e.g. if the bore holes of the catch projections become stopped up with rubble or earth, the catch elements can only be pressed into the catch projections with a great expenditure of force, which is transmitted to the catch elements by means of the interaction of the locking bar and locking bar projection. On the other hand, a force which is generated by the load acts on the locking bar element and locking bar projection when the work equipment is received by the excavator boom. Both of these cases result in quick wear and inoperativeness of the locking elements. These individual parts must therefore be exchanged frequently, which is very time-consuming and cost-intensive.

It is the object of the invention in particular to provide a solution by means of which the consequences of appearances of wear at the locking elements for the coupling for receiving and changing a front work attachment for an excavator boom can be sharply reduced, wherein a quick coupling of the work equipment to the excavator boom is simultaneously ensured.

SUMMARY OF THE INVENTION

This object is met, according to the invention by a device of the type named in the beginning in that the locking element engages in at least one of the catch recesses of the coupling plate in the coupling position.

Since the locking element engages in the opening cross section of the catch recesses and is clamped in this opening, the locking element is not acted upon by any load forces or forces which would be necessary for the coupling, so that hardly any appearances of wear caused by use occur at the locking elements and so that a quick coupling of the work equipment to the excavator boom is possible at the same time.

The invention accordingly fulfills the following requirements in particular:

- a secure and permanent clamping with all respective equipment without play is ensured;
- possible wear is compensated for without assembly costs;
- actuation and handling can be effected from the driver's seat;
- there are no changes or only slight changes in the shovel kinematics, i.e. the fulcrum of the shovel lies close to the normal pin fastening with maximum front-end dimensions of approximately 100–120 mm, so that the tear-out and breaking forces are not substantially reduced.

Losses of useful load are prevented as a result of low weight, wherein an unlimited possibility of re-tooling and retro-fitting on existing equipment is achieved simultaneously.

The possibility of use as a grab is unlimited with the quick-change device, wherein the quick connection offers uniform connecting dimensions in the individual weight classes independently of the excavator producer, so that all equipment also fits every excavator.

Additional advantages are achieved as a result of the construction of the catch recesses as openings and in that the catch elements are connected with the coupling plate in a hook-like manner and so as to form one piece or are constructed as exchangeable hook-shaped projections.

On the one hand, the insertion of the catch elements into openings can be handled in a simple manner by the excavator driver from the driver's seat, since the excavator boom need only be controlled and positioned for inserting the catch elements into the openings. A separate controlling of the catch elements carried out additionally by the excavator driver is no longer necessary.

On the other hand, no rubble or earth can stop up the openings, which would impede the insertion of the catch elements and result in appearances of wear at the catch elements, catch projections, etc. In addition, the openings enable a simple insertion of the locking bar.

Advantageous construction variants of the invention are given in the subclaims.

An embodiment variant of the invention is provided by the locking elements arranged at a swivel lever drive which can be mechanically secured in the locking position. This can be achieved e.g. by means of simple plug-in securing means with securing panels or the like. The swivel lever drive can be operated in a simple manner by the excavator driver from the driver's seat.

It has proven particularly advisable if the coupling cams engaging in the catch recesses are provided with hook-shaped projections engaging under the corresponding coupling plate, wherein the hook-shaped projections are constructed in a wedge-shaped manner so as to taper toward their hook shaft in such a way that an additional clamping action can be achieved between the coupling cams and corresponding coupling plate in the catch position.

In order to increase or improve this action, supports for the projections of the catch elements can also be provided under the coupling plates provided with the catch recesses.

Another construction variant of the invention is characterized in that the locking element, which is movable in a plane, is acted upon in the locking direction mechanically, hydraulically or electrically and/or in that the coupling plate comprises at least one surface at at least one edge of the catch recess, which surface contacts at least one surface of the locking element in the coupling position, which surfaces are constructed for forming a wedge effect.

In so doing, it is advantageous that only a few elements of simple construction are necessary for producing the lock. In addition, e.g. a wedge-shaped locking element, which is arranged so as to be displaceable in an elongated hole in the coupling plate arranged at the excavator boom, can be clamped against a corresponding, correspondingly wedge-shaped opening section in the catch recess. Additional advantages also consist in that no supports are necessary in the catch recesses and in that the hook-shaped catch elements need not have any special shape adapted to the supports and locking bar.

Finally, the invention provides in another construction that at least the coupling plate arranged at the boom arm can be detachably connected at the latter approximately in the same way as was described in the beginning as prior art with respect to the connection of front work attachments.

The special construction of the coupling head enables an adaptation to all known excavator models and the use of the original pins for fastening to the shovel arms of the excavator booms.

The small front-end dimensions between the pin fastening at the excavator arm and the contact surfaces of the clamping element are also particularly advantageous in that it makes it possible that the shovel kinematics are not changed and the grabbing or tear-out forces of the equipment are accordingly not negatively influenced. It should be stressed that this can be achieved by means of the simply constructed adapter-like coupling plates without requiring specially constructed shovel or scoop backs for maintaining the stability of the grab containers. These characteristics of the invention ensure an inexpensive retro-fitting, particularly in the subsequent outfitting of existing equipment, and the use of all existing additional equipment without impairing the capacity of the work machines.

Another advantage of the invention consists in that the compact and light construction is suitable for all device sizes (from 1-ton mini-excavators to large equipment) when correspondingly designed.

Moreover, the invention enables an unlimited use of grabbers having 2 or more shells in combination with a corresponding adapter.

BRIEF DESCRIPTION OF THE DRAWINGS

The invention is explained in more detail in the following by way of example with reference to the drawing.

DETAILED DESCRIPTION OF THE PREFERRED AND ALTERNATE EMBODIMENT

Figure 1:
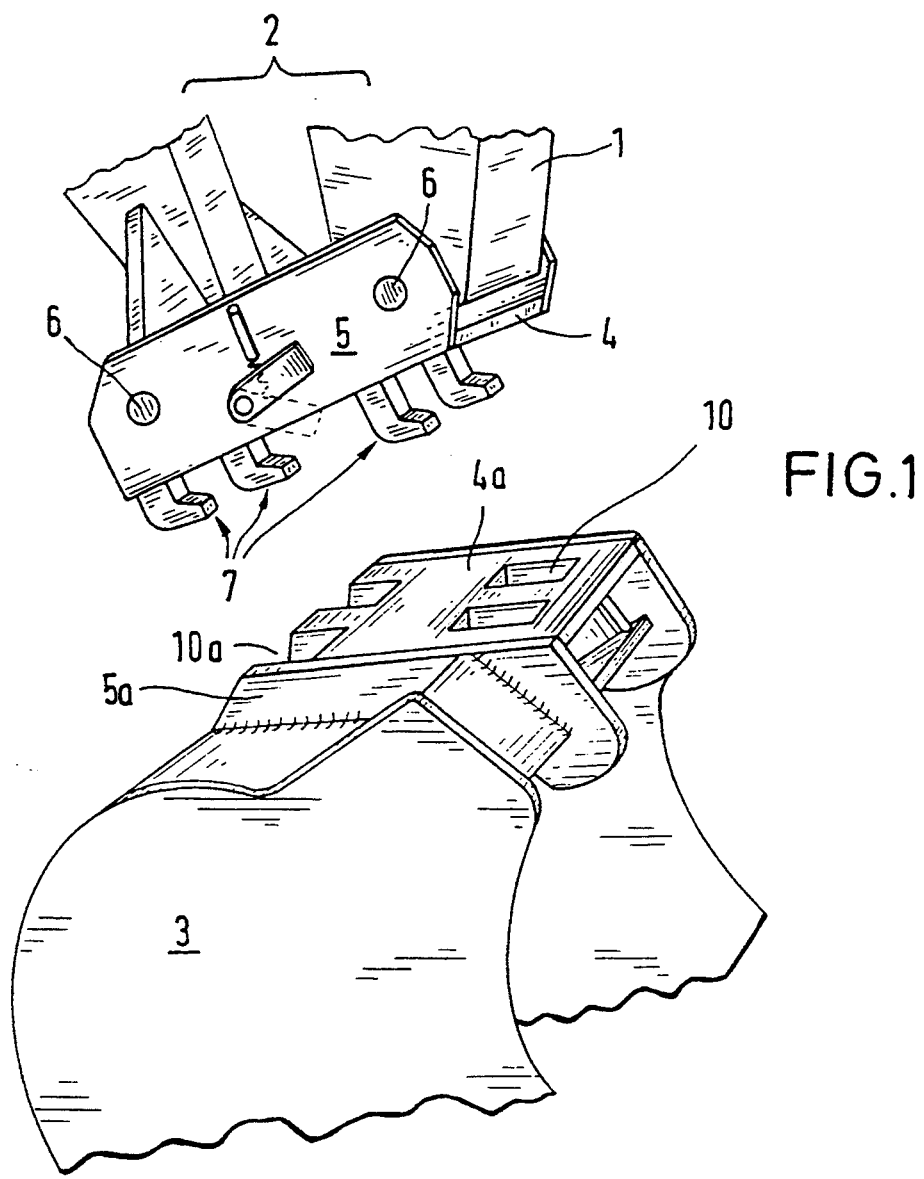
FIG. 1 shows a simplified spatial view of a portion of a support with a part of the work equipment shortly before coupling together.

The two-part device, according to the invention, is arranged at a free end, designated in general by 1, of an excavator boom 2 and at an excavator shovel, designated in general by 3. The quick coupling device, according to the invention, comprises a first coupling plate 4 and a second coupling plate 4a which contact one another in the coupling position, wherein the coupling plate 4 is fastened to the free end 1 of the excavator boom 2 by means of lateral mounting flanges, designated by 5, via a known pin/plug-in connection 6.

In the shown example, the coupling plate 4a is welded at the excavator shovel 3 via lateral flange elements 5a without the invention being limited to this type of fastening; a pin connection or a comparable detachable connection can also be provided here.

Figure 3:
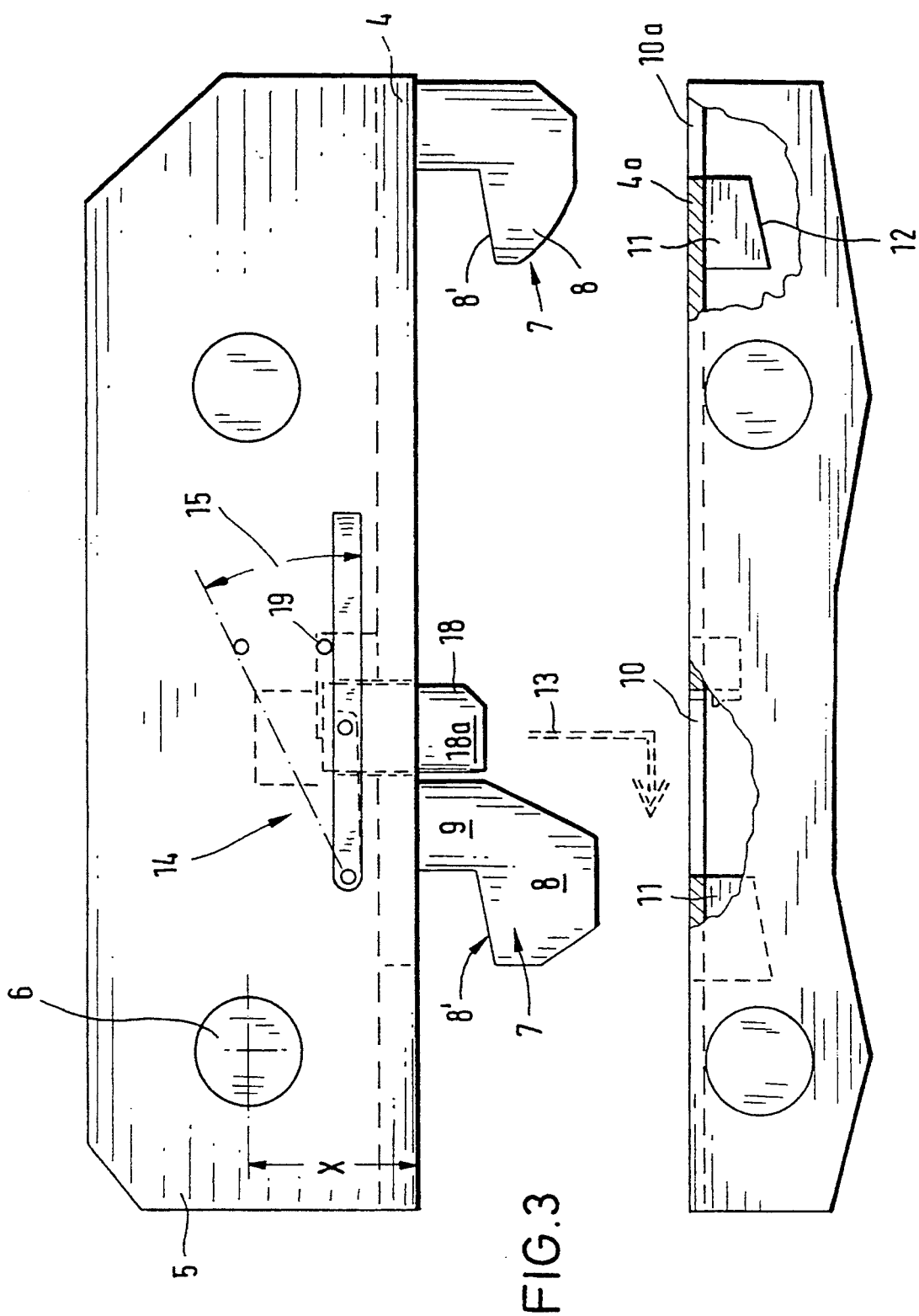
FIG. 3 shows a side view, partially broken off, of the devices according to the invention.

In the shown example, the coupling plate 4 fastened to the excavator boom 2 is equipped with four hook-shaped cams 7 with hook-shaped projections 8 at its underside, the surface of the latter which engages underneath, designated in FIG. 3 by 8', is sloped in such a way that the effective engagement gap tapers toward the shaft 9 of the engagement cam 7.

Figure 2:
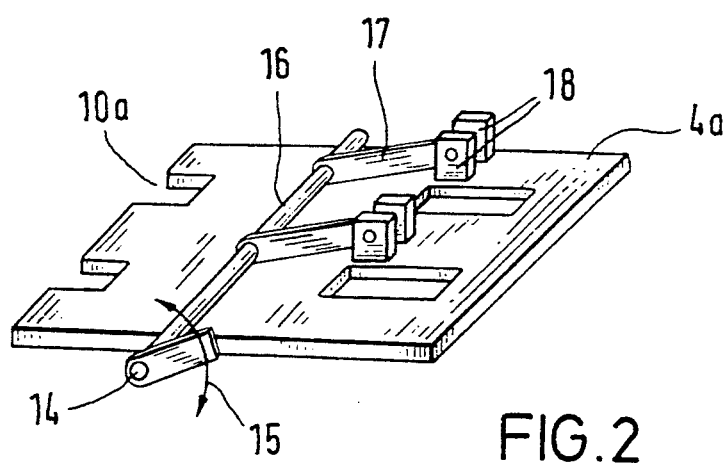
FIG. 2 shows a coupling plate with locking element in a spatially simplified view.

The corresponding coupling plate 4a is provided with two catch recesses 10 in the front area and, in the rear area, with two catch recesses 10a which open out at the edge, as can be seen e.g. from FIGS. 1 and 2. The coupling plate 4a is provided with supports 11 on the underside directly adjacent to the catch recesses 10, which supports 11 are equipped with a stop slope 12 which corresponds with the sloped engagement surface 8' at the cam projections 8 in the engagement position.

The coupling movement, divided into its two coupling directions, is indicated by the double arrow 13 in FIG. 3. If the catch cams 7 are moved into the catch recesses 10 and 10a, respectively, and displaced forward in the working direction in such a way that the clamping slopes 8 and 12, respectively, tighten the coupling plates 4 and 4a against one another, a swivel lever drive, designated in general by 14, is swiveled according to the arrow 15 in dashed lines in FIG. 2 for the purpose of securing. Two swivel levers 17, each comprising a pair of locking elements 18, are arranged at a shaft 16.

The lower area of these locking elements 18, designated in FIG. 3 by 18a, is swiveled into the open portions of the catch recesses 10 after coupling; the swivel lever drive 14 is then locked e.g. by means of a split-pin securing means at a pin 19, which is indicated only in FIG. 3. As can be seen, the catch cam 7 and its shaft 9, respectively, can then no longer be moved out of the catch recess 10.

Figure 4:
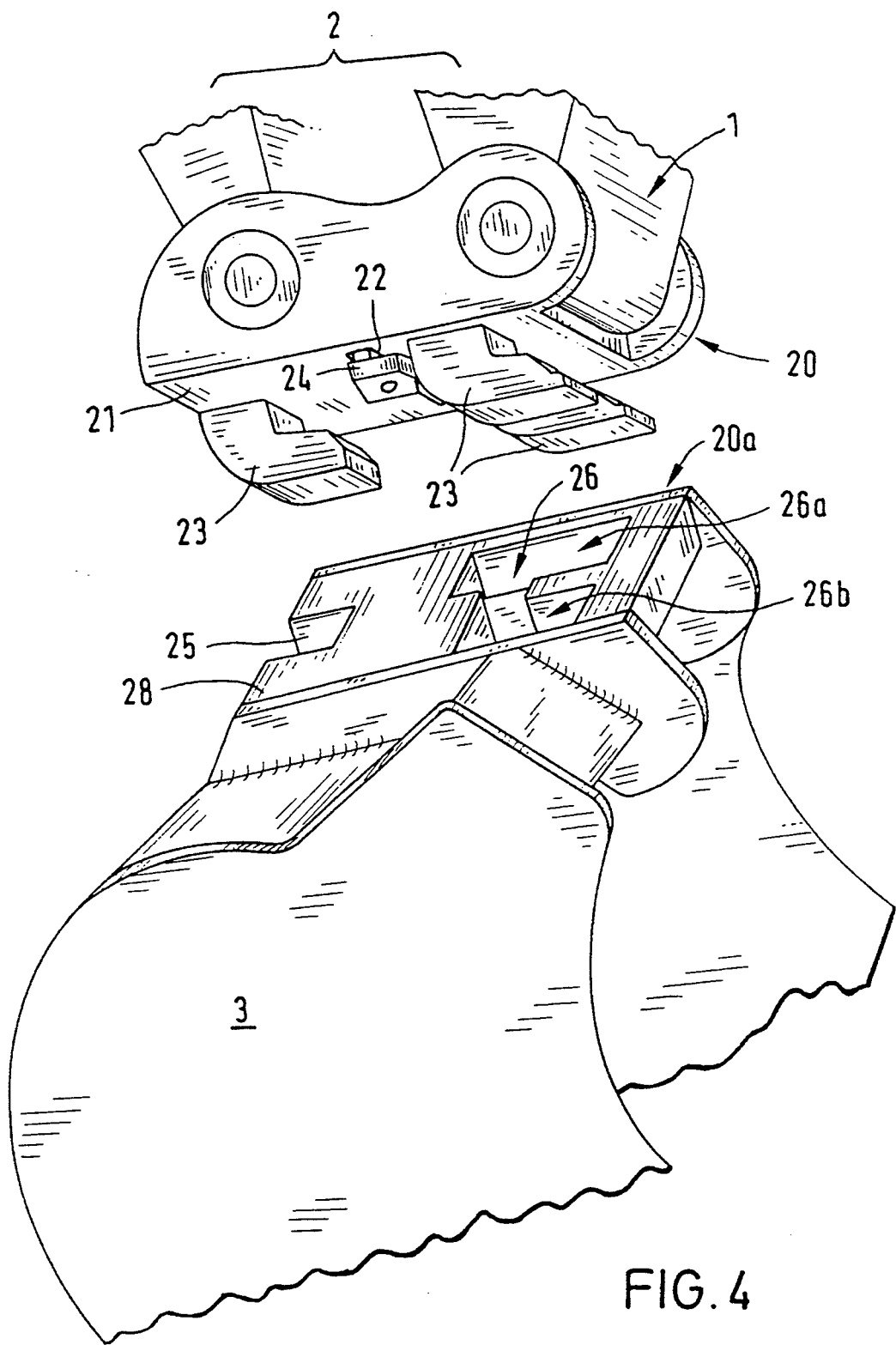
FIG. 4 shows a simplified spatial view of another construction of a portion of a support with a portion of work equipment shortly before coupling together, in an offset perspective relative to one another.
Figure 6:
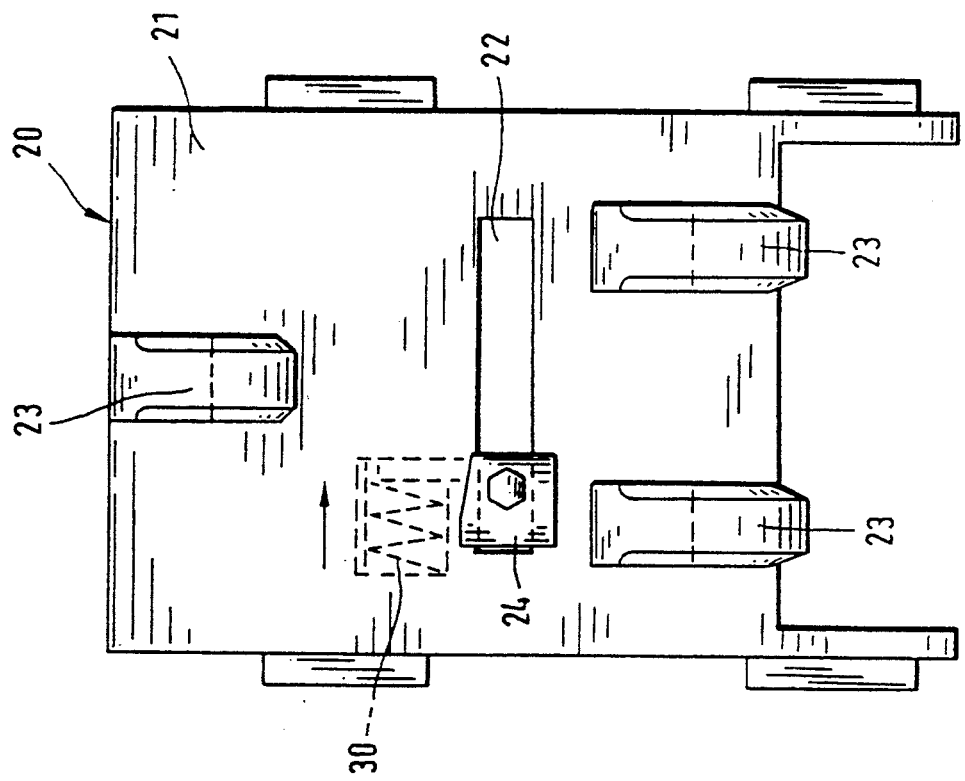
FIG. 6 shows a top view of the coupling plate at the excavator boom according to the embodiment example in FIG. 4.
Figure 5:
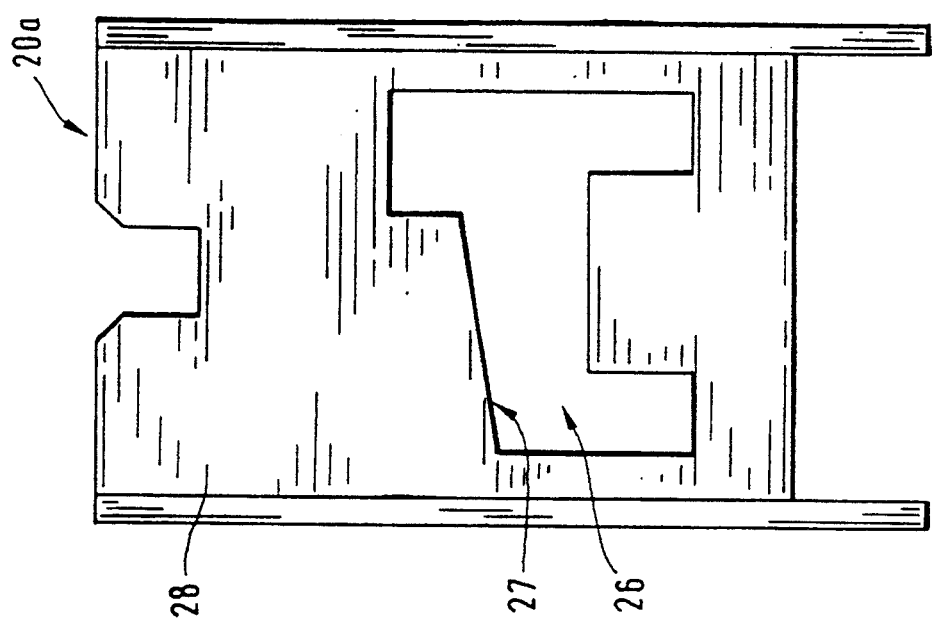
FIG. 5 shows a top view of the coupling plate at the work equipment according to the embodiment example in FIG. 4.

A construction variant, according to the invention, is shown in FIGS. 4, 5 and 6. Only the features of this device, which are different from the first embodiment form, are described and discussed in the following, wherein the same reference numbers as in the example according to FIG. 1 are used as far as possible.

A coupling plate 20 is arranged at the end of the excavator boom 2 and a coupling plate 20a is arranged at the excavator shovel 3. The coupling plate 20 comprises, at its underside 21, the hook-shaped catch elements 23 constructed as catch cams. A locking element 24 is arranged in the elongated hole 22 so as to be displaceable. The coupling plate 20a comprises, at its one end, a laterally open catch recess 25 and a branched catch recess 26 which is defined on all sides and divided into portions 26a and 26b.

FIGS. 5 and 6, which show a top view of the coupling plates 20 and 20a which contact one another in the coupling position and comprise coupling plate sides 21 and 28 which contact one another, must be considered in addition in order to understand the manner of coupling and locking. The guide edge 27 arranged for the clamping action in the catch recess 26 of the coupling plate 20a and the clamping surface 29 of the locking element 24, corresponding to the latter can be seen in particular from FIG. 5. FIG. 6 shows in particular the elongated hole 22 with the locking element 24 and the catch cam 23.

The coupling and the locking are effected in the following manner: First the catch elements 23 engage in the catch recess 25 and 26. When the coupling plates 20 and 20a contact one another, the locking bar 24 is moved along the elongated hole 22 via a spring 30 or a hydraulic device and is displaced with its clamping surface 29 along the diagonal guide edge 27 in the catch recess 26 of the coupling plate 20a until the locking bar clamps in the catch recess 26. The excavator boom and the work equipment are now securely connected with one another.

Instead of four catch cams, a greater or smaller number can be provided; the construction of the catch cams at the plates with engagement openings can also be constructed so as to be identically reverse-symmetrical; each of the plates carries a pair of catch cams as well as a pair of catch recesses. It is also possible, according to the invention, to rotate the hooks and recesses relative to the construction variants described here in order also to make the coupling system usable for tractor shovels in which the load absorption acts in the opposite direction, such as in excavator work equipment.

While the preferred and alternate embodiment of the invention has been described in detail, various adaptions and modifications may be made thereof with department from the spirit of the invention, as defined in the following claims.

I claim:

1. A device for quick coupling of work equipment to an excavator boom having a free end, said device comprising:

a first coupling plate connectable to the work equipment and having catch openings formed therein;

a second coupling plate, connectable to the free end of the boom and having hook-shaped catch elements for engaging in said catch openings of said first coupling plate thereby to couple the work equipment to the boom; and at least one locking element connected to one of said first and second coupling plates and movable in a plane in a locking direction for locking said hook-shaped catch elements in said catch openings;

wherein at least one of said catch openings has a first wedging surface and said at least one locking element has complementary second wedging surface, wherein said at least one of said catch openings has a hook-engaging surface and said hook-shaped catch element received in said at least one of said catch openings has a rear surface remote from said hook-engaging surface, and wherein said device further comprises means for wedging said at least one locking element against said first wedging surface and adjacent said rear surface for locking said hook-shaped catch elements in said catch openings upon connection of the work equipment with the boom.

2. The device of claim 1, wherein said second coupling plate comprises means for detachable connection to a boom arm.

3. The device of claim 1, further comprising identical adapter-like coupling plates similar to said first coupling plate and connectable to different tools to be coupled to the excavator boom.

* * * * *